(12) United States Patent
Xiao et al.

(10) Patent No.: US 8,947,396 B2
(45) Date of Patent: Feb. 3, 2015

(54) RESISTIVE TOUCH PANEL AND RESISTIVE TOUCH ELECTRONIC DEVICE

(71) Applicant: ScienBiziP Consulting (Shen Zhen) Co., Ltd., Shenzhen (CN)

(72) Inventors: Wei-Guo Xiao, Shenzhen (CN); Yi-Ying Chen, New Taipei (TW); Chiu-Hsiung Lin, New Taipei (TW)

(73) Assignee: ScienBiziP Consulting (Shenzhen) Co., Ltd., Guangdong (CN)

( * ) Notice: Subject to any disclaimer, the term of this patent is extended or adjusted under 35 U.S.C. 154(b) by 269 days.

(21) Appl. No.: 13/650,509

(22) Filed: Oct. 12, 2012

(65) Prior Publication Data
US 2013/0271421 A1  Oct. 17, 2013

(30) Foreign Application Priority Data
Apr. 11, 2012 (CN) .......................... 2012 1 0103990

(51) Int. Cl.
*G06F 3/045* (2006.01)
(52) U.S. Cl.
USPC .................. 345/174; 178/18.05; 178/18.06; 178/18.07
(58) Field of Classification Search
CPC ................ G06F 3/044; G06F 3/045; G06F 2203/04113; G06F 3/041
USPC .................. 345/173–174; 178/18.05–18.07
See application file for complete search history.

(56) References Cited

U.S. PATENT DOCUMENTS

| | | | | |
|---|---|---|---|---|
| 6,703,764 | B2* | 3/2004 | Lee et al. ....................... | 310/328 |
| 2008/0303795 | A1* | 12/2008 | Lowles et al. ................. | 345/173 |
| 2012/0062472 | A1* | 3/2012 | Yilmaz ......................... | 345/173 |
| 2012/0105081 | A1* | 5/2012 | Shaikh et al. ................. | 324/686 |
| 2012/0299863 | A1* | 11/2012 | Yilmaz ......................... | 345/174 |
| 2013/0000954 | A1* | 1/2013 | Hashimoto et al. ........... | 174/250 |
| 2013/0008704 | A1* | 1/2013 | Chang ........................... | 174/262 |
| 2013/0135214 | A1* | 5/2013 | Li et al. ........................ | 345/173 |
| 2013/0168138 | A1* | 7/2013 | Yamazaki et al. ............ | 174/253 |

* cited by examiner

*Primary Examiner* — Amare Mengistu
*Assistant Examiner* — Vinh Lam
(74) *Attorney, Agent, or Firm* — Novak Druce Connolly Bove + Quigg LLP

(57) ABSTRACT

A resistive touch panel includes an ITO layer, a glass layer, and an insulation layer sandwiched between the ITO layer and the glass layer. The ITO layer is cut into a continuous zigzag-shaped ITO strip by a number of first and second etched lines which are equidistantly spaced and arranged in an alternate fashion. The ITO strip is connected between a positive electrode and a negative electrode. The glass layer includes an ITO covering portion and a peripheral output bus surrounding the ITO covering portion. The resistance touch panel defines a Cartesian coordinate system for locating a touch point thereon, each touch point spatially corresponding to a given position on the ITO strip, the power supply generates a given voltage at given position of the ITO strip, the output bus transmits a signal associated with the voltage to an outside processor. A related electronic device is also provided.

11 Claims, 3 Drawing Sheets

RESISTIVE TOUCH PANEL AND RESISTIVE TOUCH ELECTRONIC DEVICE

BACKGROUND

1. Technical Field

The present disclosure relates to touch panels and, particularly, to a resistive touch panel and a resistive touch electronic device.

2. Description of the Related Art

Touch screens are common in electronic devices. A four-wire resistive touch screen employed in the touch screen may include a film layer, a glass layer, and an ITO (indium tin oxide) layer sandwiched between the film layer and the glass layer. There are two buses on two opposite sides of the film layer, and two buses on another two opposite sides of the glass layer. The film layer contacts the glass layer when the film layer is touched by an object, thereby detecting a voltage at the point of contact to determine a touched position. However, the glass layer is easily defective which results in malfunction of the touch screen.

Therefore, there is room for improvement within the art.

BRIEF DESCRIPTION OF THE DRAWINGS

The components in the drawings are not necessarily drawn to scale, the emphasis instead being placed upon clearly illustrating the principles of the disclosure. Moreover, in the drawings, like reference numerals designate corresponding parts throughout the several views.

DETAILED DESCRIPTION

Figure 1:
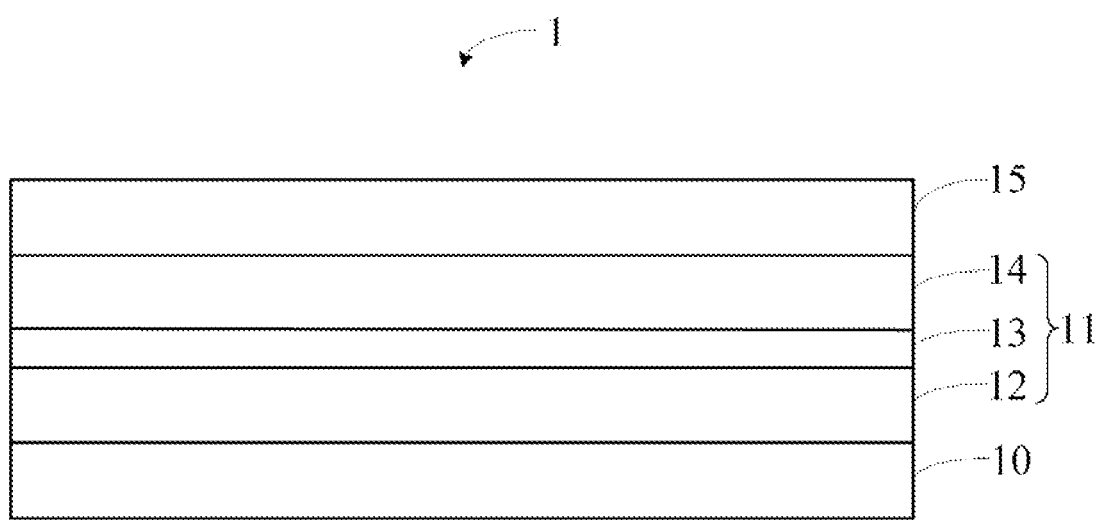
FIG. 1 is a schematic view of a resistive touch electronic device, according to an exemplary embodiment.

Referring to FIG. 1, a resistive touch electronic device 1 includes a transparent substrate 10 and a resistive touch panel 11 mounted on the substrate 10. The resistive touch panel 11 includes a transparent indium tin oxide (ITO) layer 12, an insulation layer 13, and a transparent glass layer 14. The insulation layer 13 is sandwiched between the ITO layer 12 and the glass layer 14. In the embodiment, the touch panel 11 further includes a transparent protective layer 15, covering the glass layer 14.

Figure 2:
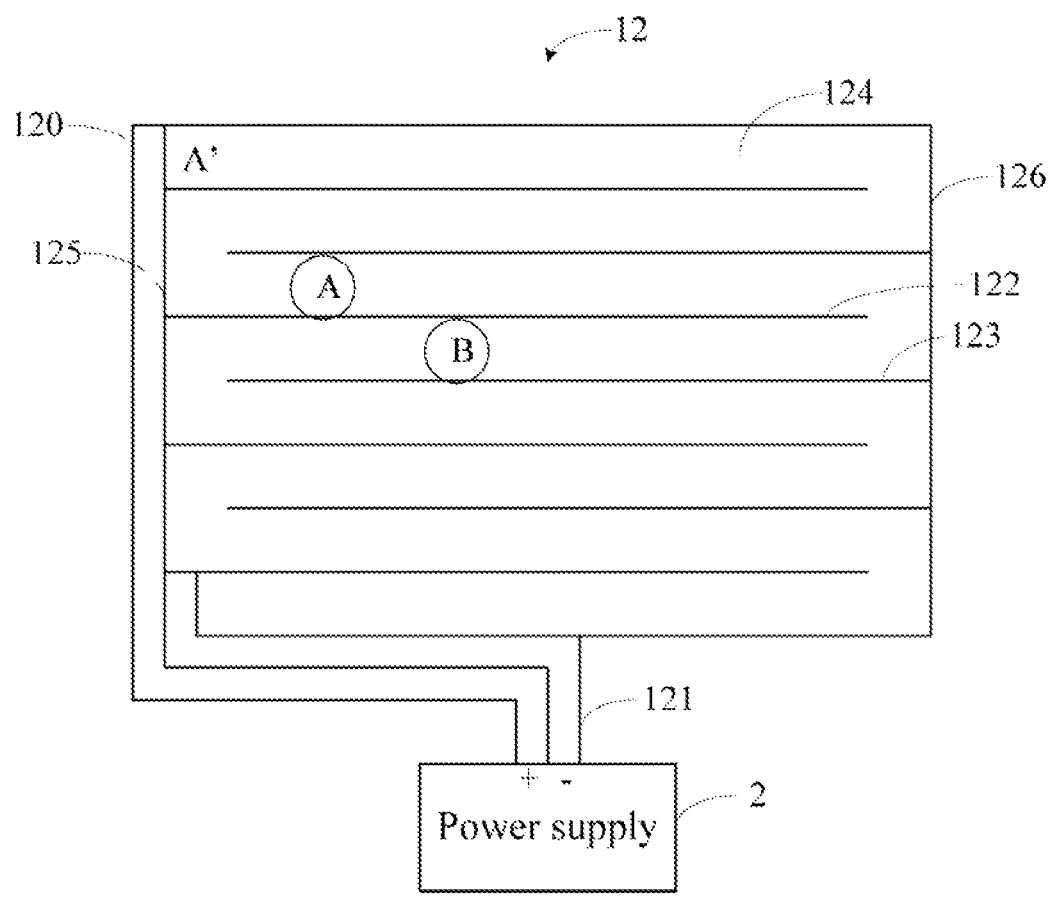
FIG. 2 is a schematic view of an indium tin oxide (ITO) layer of a resistive touch panel of FIG. 1.

Referring to FIG. 2, the ITO layer 12 includes a positive electrode 120 and a negative electrode 121 insulated from the positive electrode 120. The ITO layer 12 is cut into a continuous zigzag-shaped ITO strip 124 having a resistance value by a number of first etched lines 122 and a number of second etched lines 123. The first and second etched lines 122 and 123 are equidistantly spaced and arrange in an alternate fashion. The first etched lines 122 are aligned with each other, and the second etched lines 123 are aligned with each other. In the embodiment, each first etched line 122 extends from a first edge 125 of the ITO layer 12 toward an opposite second edge 126 and terminates at a position away from the second edge 126. Each second etched line 123 extends from the second edge 126 of the ITO layer 12 toward the first edge 125 and terminates at a position away from the first edge 125.

The ITO strip 124 is connected between a first end of the positive electrode 120 and a first end of the negative electrode 121. A power supply 2 is connected between a second end of the positive electrode 120 and a second end of the negative electrode 121.

Figure 3:
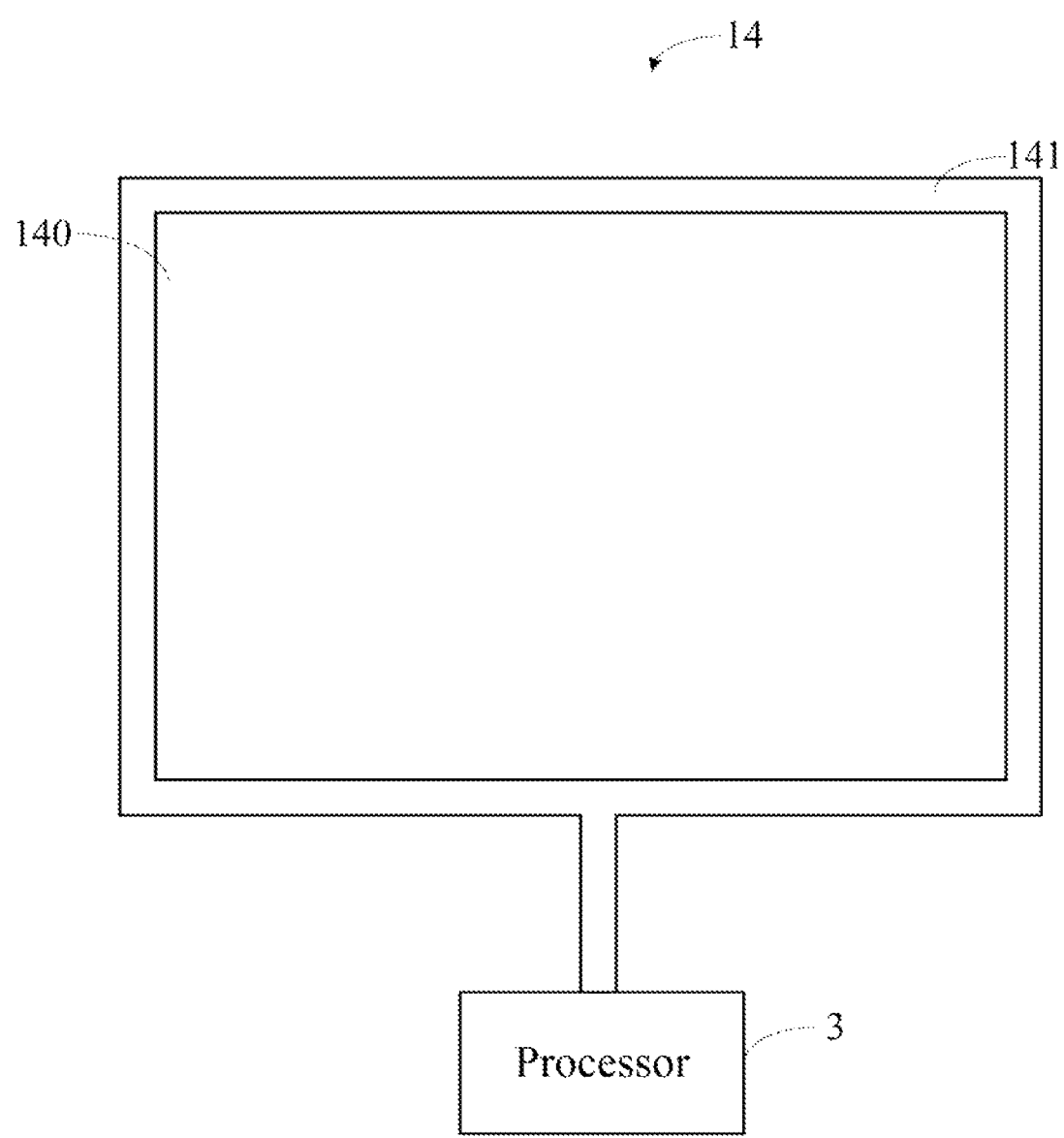
FIG. 3 is a schematic view of a glass layer of the resistive touch panel of FIG. 1.

Referring to FIG. 3, the glass layer 14 includes an ITO covering portion 140 and a peripheral output bus 141 surrounding the ITO covering portion 140. The ITO covering portion faces the ITO layer 12. The output bus 141 is connected to a processor 3.

The resistance touch panel 1 defines a Cartesian coordinate system for locating a touch point thereon, each touch point spatially corresponding to a given position on the ITO strip 124. The power supply 2 is configured for generating a given voltage at given position of the ITO strip 124. For example, the voltage value of point A of the ITO strip 124 is in proportion to the length between the point A and the beginning A' of the ITO strip 124.

When the panel 11 is touched by an object such as a fingertip, the ITO layer 12 is pushed to contact the glass layer 14. A voltage value V' is generated on a point B of the ITO covering portion 140 where the ITO layer 12 makes contact with the glass layer 14 under the pressure of the object, and the output bus 141 transmits the voltage value V' to the processor 3. The processor 3 determines the coordinates of the point B according to the voltage value V', and thus further determines the touch position.

In detail, the length of the ITO layer 12 may be L, the width of the ITO layer 12 is D, and the first predetermined distance is H; then the processor 3 determines a length L' between the point B and the beginning of the ITO strip 124 according to the voltage value V', and further determines the coordinates of point B according to the length L, the width D, and the length L'. In the embodiment, the processor 3 determines the coordinates of point B according to the formula: $x=n$, $y=(m+1)*H$, wherein m is the integer quotient of L' dividing L, and n is the remainder of L' dividing L.

It is understood that the present disclosure may be embodied in other forms without departing from the spirit thereof. The present examples and embodiments are to be considered in all respects as illustrative and not restrictive, and the disclosure is not to be limited to the details given herein.

What is claimed is:

1. A resistive touch panel comprising:
    an indium tin oxide (ITO) layer comprising a positive electrode and a negative electrode, wherein the ITO layer is cut into a continuous zigzag-shaped ITO strip by a number of first etched lines and a number of second etched lines, the first and second etched lines being equidistantly spaced and arranged in an alternate fashion, the ITO strip is connected between a first end of the positive electrode and a first end of the negative electrode, a power supply is connected between a second end of the positive electrode and a second end of the negative electrode;
    a glass layer comprising an ITO covering portion and a peripheral output bus surrounding the ITO covering portion, wherein the ITO covering portion faces the ITO layer, the output bus is connected to the ITO covering portion; and
    an insulation layer sandwiched between the ITO layer and the glass layer;
    wherein the resistance touch panel defines a Cartesian coordinate system for locating a touch point thereon, each touch point spatially corresponding to a given position on the ITO strip, the power supply configured to generate a given voltage at given position of the ITO strip, the output bus configured to transmit a signal associated with the voltage to an outside processor.

2. The resistance touch panel as recited in claim 1, further comprising a transparent protective layer covering the glass layer.

3. The resistance touch panel as recited in claim 1, wherein the first and second etched lines are parallel straight lines.

4. The resistance touch panel as recited in claim 3, wherein the first etched lines are aligned with each other, and the second etched lines are aligned with each other.

5. The resistance touch panel as recited in claim 3, wherein the first etched lines extend from a first edge of the ITO layer toward an opposite second edge and terminate at a position away from the second edge, the second etched lines extend from the second edge of the ITO layer toward the first edge and terminate at a position away from the first edge.

6. A resistive touch electronic device comprising:
   a substrate;
   a resistance touch panel comprising:
      an indium tin oxide (ITO) layer comprising a positive electrode and a negative electrode, wherein the ITO layer is cut into a continuous zigzag-shaped ITO strip by a number of first etched lines and a number of second etched lines, the first and second etched lines being equidistantly spaced and arranged in an alternate fashion, the ITO strip is connected between a first end of the positive electrode and a first end of the negative electrode, a power supply is connected between a second end of the positive electrode and a second end of the negative electrode;
   a glass layer comprising an ITO covering portion and a peripheral output bus surrounding the ITO covering portion, wherein the ITO covering portion faces the ITO layer, the output bus is connected to the ITO covering portion; and
   an insulation layer sandwiched between the ITO layer and the glass layer;
   wherein the resistance touch panel defines a cartesian coordinate system for locating a touch point thereon, each touch point spatially corresponding to a given position on the ITO strip, the power supply configured to generate a given voltage at given position of the ITO strip;
   a processor connected to the output bus, the output bus configured to transmit a signal associated with the given voltage to an outside processor.

7. The resistive touch electronic device as recited in claim 6, wherein further comprising a transparent protective layer covered on the glass layer.

8. The resistive touch electronic device as recited in claim 6, wherein the first and second etched lines are parallel straight lines.

9. The resistive touch electronic device as recited in claim 8, wherein the first etched lines are aligned with each other, and the second etched lines are aligned with each other.

10. The resistive touch electronic device as recited in claim 8, wherein the first etched lines extend from a first edge of the ITO layer toward an opposite second edge and terminate at a position away from the second edge, the second etched lines extend from the second edge of the ITO layer toward the first edge and terminate at a position away from the first edge.

11. The resistive touch electronic device as recited in claim 6, wherein the processor determines a length between the point where being touched and beginning of the ITO strip according to the voltage value transmitted by the output bus, and further determines the coordinate of the point where being touched according to the determined length, the width of the ITO layer, the length of the ITO layer, the first predetermined distance, and the second predetermined distance.

* * * * *